2,654,900

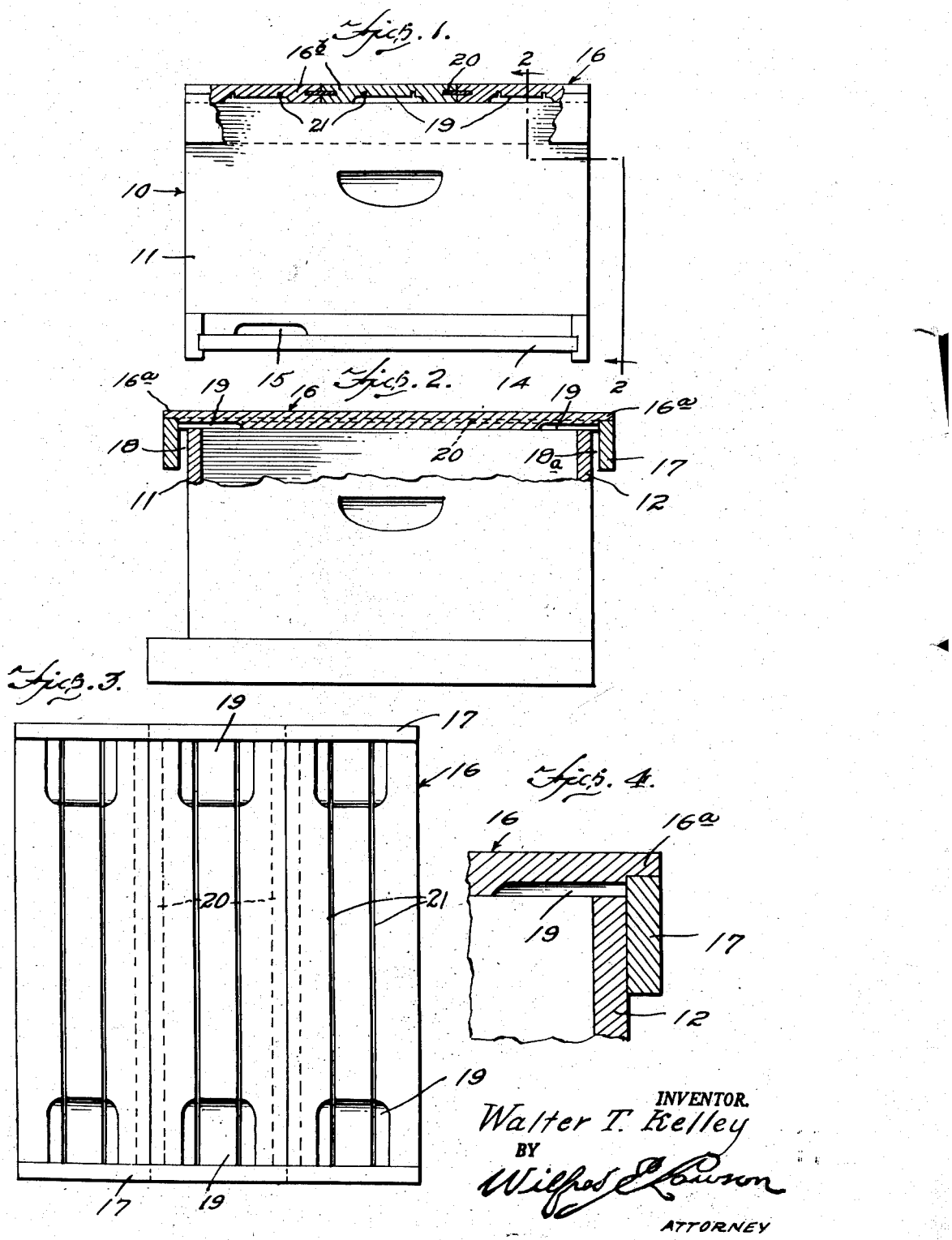
Oct. 13, 1953     W. T. KELLEY     2,654,900
VENTILATING COVER FOR BEEHIVES
Filed Jan. 31, 1950
INVENTOR.
Walter T. Kelley
BY
ATTORNEY Patented Oct. 13, 1953

UNITED STATES PATENT OFFICE 2,654,900

VENTILATING COVER FOR BEEHIVES

Walter T. Kelley, Paducah, Ky.

Application January 31, 1950, Serial No. 141,550

2 Claims. (Cl. 6—1)

This invention relates to the science of apiculture and is directed particularly to improvements in ventilating bee hives.

It is well known to bee keepers that proper ventilation of a bee hive plays an important part in running of the hive, since moisture is always present in the air within the hive and insufficient ventilation in winter may cause molding of the combs and collection, by condensation, of water at the hive entrance which will kill the bees, while in the summer the hive temperature may rise to such a degree as to completely stop the bees from working or prevent the workers from evaporating the nectar to the extent necessary for production of honey with a desirable low moisture content. Various expedients are employed by bee keepers to properly ventilate the hives but most of them have disadvantages which are avoided by the present invention.

An important object of the present invention, in the light of the foregoing, is to provide an improved hive top or cover by means of which controlled ventilation of the hive may be had, while at the same time the hive is effectively protected against the entrance of rain, robber bees, moths or other predatory insects.

Another object of the invention is to provide a bee hive top or cover which can be shifted from a full ventilating position to a shut-off position in which ventilation is fully stopped.

Another object is to provide a hive top or cover having vent openings which are so arranged or located that an indirect ventilation or air circulation through the hive may be had and which are bee and rain proof and bee tight.

The invention will be best understood from a consideration of the following detailed description taken in connection with the accompanying drawing forming a part of the specification, with the understanding, however, that the invention is not to be limited to the exact details of construction shown and described since obvious modifications will occur to a person skilled in the art.

In the drawing:

Figure 1 is a view in front elevation of a bee hive having thereon a top or cover constructed in accordance with a preferred embodiment of the invention, a portion of which cover is broken away.

Figure 2 is a view in side elevation with the cover and upper parts of the front and back walls sectioned substantially on the line 2—2 of Figure 1.

Figure 3 is a view of the underside of the hive top or cover.

Figure 4 is a detail section on an enlarged scale, through the top part of the hive at the rear thereof, approximately on the same section line as indicated for the top part of Figure 2, but showing the top shifted to close the vents at the rear of the hive.

Referring more particularly to the drawing the numeral 10 generally designates the body of the hive which comprises the front and rear walls 11 and 12, respectively and side walls 13. At the front is the alighting ledge 14 at the bottom part of the front wall and the bee entrance and exit opening 15.

The numeral 16 generally designates the top or cover of the present invention. This top comprises a panel or wall of proper dimensions to completely close the top of the hive body when placed thereover in resting position upon the tops of the four walls, and has a length slightly greater than the front to rear dimensions of the hive body so that it may be placed to have a portion at each end project outwardly beyond the adjacent wall as at 16a, in Figures 2 and 4.

Secured across each end of the top or cover body, upon the underside thereof is an end rail 17. The distance between the adjacent or inner faces of these rails is greater than the distance between the remote or outer faces of the front and rear walls 11 and 12, so that when the top or cover is centrally positioned on the body, by which is meant positioned to have an equal amount of projecting portion 16, there will be left a slight air space 18 between each rail and the adjacent wall as shown in Figure 2.

At each end of the top or cover, the under face has cut therein several wide and long recesses 19, each of which is of a length considerably greater than the thickness of the wall across which it extends, as shown in Figures 2 and 4. These recesses terminate at, or are covered at their outer ends by, the adjacent end rails. Accordingly it will be seen that when the top or cover is centrally positioned on the body, air may move from within the hive across the top edges of the front and rear walls, through the recesses to the air spaces 18 and 18a.

If the air movement is to be checked or fully stopped this may be effected by shifting the top forwardly or backwardly to bring a rail nearer to the adjacent wall and reduce or completely eliminate the air space 18 or 18a, as shown in Figure 4.

The top or cover may, if desired, be made of a single piece of material or it may be made up, as here shown, of several pieces 16b joined edge to edge, and locked together in addition to being glued, by connecting key strips 20.

It is well known, of course, that the hive cover or top will be subjected to extreme changes of temperature since it is out of doors at all times and, being the top part of the hive it is fully exposed to the sun and to rain and snow. Accordingly such cover would be subject to extreme warping and in order to avoid or counteract this the underside of the cover has cut therein, longitudinally of the pieces of which the cover is made up, or to run lengthwise with the grain in any event, whether the cover is made up of individual pieces or a single piece of material, the deep relatively wide saw slots 21. By providing these slots the material of the cover is allowed to give under extreme changes of temperature and the cover will be maintained flat at all times.

The depth of the recesses 19 is insufficient to permit bees or moths to pass over the tops of the walls 11 and 12, but does allow a free flow of air so that the necessary ventilation is had.

I claim:

1. As a new article of manufacture, a ventilating cover for a bee hive, comprising a rectangular panel having a substantially uniplanar lower surface and having a length greater than the length of the hive with which it is used, and rails depending from opposed ends of said panel, said panel having equidistantly spaced recesses formed in its lower surface extending inwardly from said rails so as to admit air to the interior of the hive from both directions when the cover is centered on the hive, the recesses at one end of the panel being closed against air admittance when the cover is shifted endwise to move a rail into abutting relation with respect to an opposed side wall of the hive.

2. The cover as defined in claim 1, in which the said panel comprises several sections disposed in edge-to-edge relation, said sections having opposed grooves, key elements engaged in the said grooves of said sections to secure them together, one of said recesses being formed centrally of each of the end portions of a section, and each section having a pair of spaced parallel saw kerfs formed longituinally in its lower side, said kerfs opening into said recesses.

WALTER T. KELLEY.

References Cited in the file of this patent

UNITED STATES PATENTS

| Number | Name | Date |
|---|---|---|
| 110,517 | Walker | Dec. 27, 1870 |
| 577,794 | Stickney | Feb. 23, 1897 |
| 1,523,318 | Utton | Jan. 13, 1925 |
| 2,016,979 | Wilson | Oct. 8, 1935 |
| 2,498,880 | Diehnelt | Feb. 28, 1950 |
| 2,530,801 | Babcock | Nov. 21, 1950 |
| 2,548,275 | Watkins | Apr. 10, 1951 |
| 2,578,103 | Stulce | Dec. 11, 1951 |